Aug. 6, 1929.  W. KUMMERER  1,723,485
COUPLING CIRCUIT
Filed Feb. 1, 1926
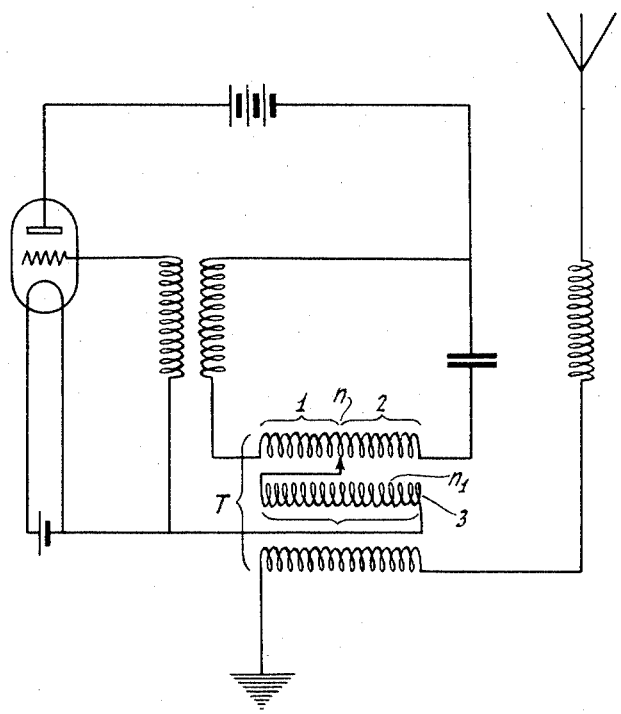
INVENTOR
WILHELM KUMMERER
BY
ATTORNEY Patented Aug. 6, 1929.

1,723,485

UNITED STATES PATENT OFFICE.

WILHELM KUMMERER, OF BERLIN, GERMANY, ASSIGNOR TO GESELLSCHAFT FÜR DRAHTLOSE TELEGRAPHIE M. B. H., OF BERLIN, GERMANY.

COUPLING CIRCUIT.

Application filed February 1, 1926, Serial No. 85,084, and in Germany April 20, 1925.

The present invention relates to a circuit arrangement designed to prevent the transfer of overtones from the tuning circuit of a generator to the consuming, load circuit, or antenna, the idea underlying the same to be explained in more detail in what follows by reference to the accompanying drawing.

The figure shows a regeneratively coupled transmitter tube connected to the tuning circuit to which an aerial is coupled. Now, according to the invention, the coupling of the antenna is effected by way of a transformer T which contains three primary windings, winding 1 which is inserted in the inductive branch of the tuning circuit, winding 2 in the capacitive branch, and winding 3 in the supply current circuit. These primary windings are passed by the currents of fundamental frequency as well as by the overtones, the currents of fundamental frequency flowing in windings 1 and 2 being almost of equal value. However, as regards the harmonics the impedance of the inductive branch is substantially higher than that of the capacitive branch. For instance, the currents of the first harmonic flowing through the capacitive and the inductive branches are approximately at the ratio of 1:4. If the assumption is made that the number of turns of the primary coils 1 and 2 are identical, and that their total is $n$ turns, then the number of ampere turns of coils 1 and 2 for the first harmonic, provided that in the capacitive branch the current there flowing is 4, and in the inductive branch the current is 1, will be $$\frac{4n}{2}+\frac{n}{2}=\frac{5n}{2}.$$

In the coil 3 passed by the supply current and comprising a number of turns $n_1$, there flows a current of value 3 and the number of the ampere turns is $3 \times n_1$. The currents in the windings 1 and 2 have the same direction. Now, if the winding 3 is so oriented or disposed that the current flowing therein is opposite to the currents in 1 and 2, then, with suitable construction of the three coils, it is possible to attain compensation of the magnetic field of these coils when the ampere turns of coils 1 and 2, on the one hand, and coil 3 on the other hand, are made equal to one another, in other words, if in the case hereinbefore cited, the number of turns $n_1$ of coil 3 is made $=5/6\ n$, since in such case, with a value of the currents in the three windings as indicated, the sum total of the ampere turns of coils 1 and 2 is equal to the ampere turns of coil 3.

By an arrangement according to the invention, as will be seen, it is possible to compensate the transfer of a definite overtone into the aerial. It is obvious that the coupling may be accomplished through other means than inductance such as capacitance or pure resistance.

Having thus described my invention, what I claim is:—

1. In a radio system, a supply circuit, a tuning circuit including an inductive branch and a capacitive branch, a load circuit and means for coupling the tuning circuit to the load circuit, said coupling means comprising a transformer consisting of three primary windings and a secondary winding, one primary winding being inserted in the inductive branch of the tuning circuit, the second winding of said primary windings being inserted in the capacitive branch of the tuning circuit and a third winding of said primary windings being in a circuit which connects the inductive branch and the capacitive branch to the supply circuit.

2. In a device of the kind described a supply circuit, a tuning circuit, a load circuit, and means for coupling said last two mentioned circuits comprising a primary coil and a secondary coil and means in the supply circuit for opposing the passage of a predetermined harmonic in the tuning circuit.

3. In a device of the kind described a supply circuit, a load circuit, and a tuning circuit having an inductive branch and a capacitive branch, means comprising a transformer having three primary windings and a secondary winding for coupling said last two named circuits, one primary winding being inserted in the inductive branch of the tuning circuit, the second primary winding being inserted in the capacitive branch of the tuning circuit and the third primary winding being in a circuit which connects the inductive branch and the capacitive branch to the supply circuit.

4. In a high frequency system, a supply circuit, a load circuit, a tuning circuit having an inductive branch and a capacitive branch, coupling means comprising a pair of primary windings disposed respectively in the tuning circuit and the supply circuit and a secondary winding for coupling said load circuit and the tuning circuit, and means controlled by the relative position and number of turns in said primary windings whereby the passage of a current of predetermined frequency may be restricted.

5. In high frequency coupling arrangements for suppression of transmission of harmonics, a supply circuit, a circuit tuned to the utilization frequency comprising inductive and capacity branches in parallel, said supply circuit being connected to the junctions of said branches, a coupling inductance, said coupling inductance being disposed in part in the capacity branch and in part in the inductive branch, an inductance in the supply circuit coupled to said coupling inductance and a third inductance coupled to the coupling inductance for utilizing the fundamental frequeny.

6. In high frequency coupling arrangements for suppression of transmission of harmonics, a supply circuit, a circuit tuned to the fundamental utilization frequency comprising inductive and capacity branches in parallel and a coupling inductance, substantially equal portions of said coupling inductance being disposed in the capacitive and inductive branches of the tuned circuit, an inductance in the supply circuit coupled to said coupling inductance in a direction for opposing the magnetic field of said coupling coil for the freqeuncy of the harmonic to be eliminated and a third inductance coupled to the coupling inductance for utilizing the fundamental frequency.

7. In high frequency coupling arrangements for elimination of the double frequency harmonic, a circuit tuned to the fundamental frequency comprising inductive and capacitive branches in parallel, coupling inductance, substantially half of said coupling inductance being disposed in the capacity branch and the other half in the inductive branch, a coil in the supply circuit coupled to said coupling inductance and having smaller number of turns than that of the coupling inductance and a third inductance inductively related to the coupling inductance for utilizing the fundamental frequency.

8. In high frequency circuits for suppression of harmonics, an oscillation circuit comprising inductive and capacity branches in parallel, a supply circuit, an inductance divided between the inductive and capacity branches and an inductance in the supply circuit coupled to said inductance in opposition to the harmonic current in said first-mentioned inductance.

WILH. KUMMERER.